(12) United States Patent  (10) Patent No.: US 7,241,955 B2
Hebenstreit  (45) Date of Patent: Jul. 10, 2007

(54) METHOD AND APPARATUS FOR WEIGHING DIVIDED PORTIONS

(75) Inventor: Paul Hebenstreit, St. Louis, MO (US)

(73) Assignee: Bakery Systems, Inc., St. Louis, MO (US)

( * ) Notice: Subject to any disclaimer, the term of this patent is extended or adjusted under 35 U.S.C. 154(b) by 33 days.

(21) Appl. No.: 10/768,549

(22) Filed: Jan. 30, 2004

(65) Prior Publication Data

US 2005/0167163 A1  Aug. 4, 2005

(51) Int. Cl.
  G01G 13/02  (2006.01)
  A21D 6/00  (2006.01)

(52) U.S. Cl. ............ 177/83; 177/84; 264/40.4; 425/140; 426/596

(58) Field of Classification Search ........ 177/83–88; 264/40.4; 425/140; 426/596
See application file for complete search history.

(56) References Cited

U.S. PATENT DOCUMENTS

| | | | | |
|---|---|---|---|---|
| 3,539,028 A | * | 11/1970 | Krolopp | 177/83 |
| 3,921,737 A | * | 11/1975 | Pleus | 177/86 |
| 3,997,013 A | | 12/1976 | Brook | 177/52 |
| 4,130,171 A | * | 12/1978 | Smith et al. | 177/1 |
| 4,163,488 A | | 8/1979 | Brook | 177/52 |
| 4,420,051 A | | 12/1983 | Furuta et al. | 177/25.12 |
| 4,681,176 A | * | 7/1987 | Moran et al. | 177/114 |
| 4,967,857 A | | 11/1990 | Kent et al. | 177/145 |
| 5,244,100 A | | 9/1993 | Regier et al. | 209/556 |
| 5,723,824 A | | 3/1998 | Stadler | 177/145 |
| 6,407,346 B1 | * | 6/2002 | Baker | 177/83 |
| 6,441,321 B1 | * | 8/2002 | Hebenstreit | 177/50 |
| 6,521,847 B1 | | 2/2003 | Ostermann | 177/134 |
| 7,154,055 B2 | * | 12/2006 | Hebenstreit | 177/83 |
| 2005/0194193 A1 | * | 9/2005 | Hebenstreit | |

* cited by examiner

*Primary Examiner*—Randy W. Gibson
(74) *Attorney, Agent, or Firm*—Bryan Cave, LLP

(57) ABSTRACT

An apparatus and method for automatically weighing portions of semi-solid matter using a weigh station having a rotating receptacle which receives the portion so that an accurate weight indication of the portion can be taken, and propels the portion from the weigh station to a further conveyor or processing system, a drive motor which powers the weigh station through a disengageable motor drive connection, and a weight signal processor which converts and stores the weight indications as weight data and transmits appropriate control signals to the drive motor, whereby variations in the weight of each portion are measured and evaluated to control the further processing of each portion, according to whether the portion weight is within predetermined parameters.

21 Claims, 4 Drawing Sheets

METHOD AND APPARATUS FOR WEIGHING DIVIDED PORTIONS

FIELD OF THE INVENTION

The described invention relates to an apparatus and method for weighing portions of semi-solid matter, such as bread dough, at high production rates, and to such apparatus and method whereby variations in the weight of each portion are measured and evaluated to control the further processing of each portion, according to whether the portion weight is within predetermined parameters.

BACKGROUND OF THE INVENTION

Commercial dough production often involves production of large quantities of individual dough portions Weight monitoring of dough portions has been carried out by checkweighing systems, such as weigh belts and weigh belt feeder systems. These apparatus, however are only capable of determining a projection of the actual static weight by collecting samples of output from a weight sensor as individual dough portions, as well as the section of the conveyor belt supporting the portion, pass over the sensor. Also, as the weight samples are collected, the data accuracy can be degraded by the effects of air currents, vibration from surrounding equipment, vibrations or harmonics generated by the dough portion's movement on the conveyor and other physical forces on the sensor.

Also, since it is necessary to use a weighing device with sufficient capacity to support the weight of the empty conveyor along with the weight of the dough portion to be weighed, larger capacity weight sensors must be used, which are much less sensitive than smaller weighing sensors of the same variety.

Additionally, due to the physical properties of extruded dough portions, they tend to adhere to any surface they contact. To limit the amount of adhesion, it is common for flour to be sifted onto the devices transporting dough portions. In prolonged operation, flour may randomly accumulate in various locations along the transport mechanism, including in the area where weight measurements are taken, thus introducing errors in the weight indications.

Further, due to the semi-solid nature of raw dough, transporting dough portions by a belt conveyor requires that the plane of the initial conveyor belt be at a higher elevation than subsequent downstream conveyor belts, to eliminate the possibility of dough portion being forced downward through the transition between consecutive sets of conveyor rollers. Also, in a system employing an in-motion belt weighing mechanism, the abrupt transition of the dough portion from an upstream conveyor to the weighing conveyor can impart an impact or torsion force to the weight sensor, resulting in inaccuracies in the measured weight.

Additionally, there are physical constraints with in-motion weighing systems, including that the weighing conveyor must be of substantial length, generally at least thirty inches, which may create problems in integrating the weighing system with existing equipment.

Another commonly used means of weighing divided dough portions involves the use of a static weigh scale, whereby an operator may randomly remove and weigh dough portions and perform a statistical calculation to determine if portion weights are acceptable. This method also has several disadvantages, including that substantial variations in individual portions may remain undetected and that removal of sample portions from the processing sequence may affect production efficiency.

SUMMARY OF THE INVENTION

Thus, a need remains for a system to continuously monitor the weight of divided dough portions at high production rates without human intervention. Preferably, such a system may also automatically control the processing of individual dough portions according to the variations in the portion weight from a predetermined desired weight standard.

The present invention satisfies these needs and provides an apparatus and method for continuously monitoring the weight of divided dough portions at high production speeds, and is capable of automatically controlling the processing of individual dough portions according to the variations in the portion weight from a predetermined desired weight standard.

One preferred embodiment of the present invention comprises a dough production mechanism, a conveyor system configured to transport dough portions from the production mechanism to the weighing apparatus, a weigh station which receives the dough portion from the conveyor system, supports the dough portion so that an accurate weight indication of the portion can be taken, and propels the dough portion from the weigh station to a further conveyor or processing system, a drive motor which powers the weigh station through a disengageable motor drive connection, and a weight signal processor which converts and stores the weight indications as weight data and transmits appropriate control signals to the drive motor.

The conveyor system preferably is equipped with flour sifters above the conveyor bed to flour the dough portion and prevent adhesion as it travels on the conveyor.

Each successive dough portion is positioned on the rotating receptacle by the forward momentum of the portion from the conveyor system. The weigh station dampens the kinetic energy imparted to the dough portion by the conveyor system by resisting displacement, through the use of components such as counter forces with spring or elastomeric material resistance devices and/or the inertia or displacement of the weigh station itself.

This invention comprises a method and apparatus for determining the weight of portions of semi-solid portions, such as bread dough, at high rates of processing. The apparatus comprises a weigh station having a rotating receptacle of ultra high molecular weight plastic (UHMW) or other light weight, non-stick material. The rotating receptacle receives individual dough portions from an incoming conveyor system, supports them so that a combined weight indication of the portion and the rotating receptacle can be taken, and then rotates to propel the portion for further processing. Based upon whether the weight indication is within predetermined tolerances, the weight signal processor may transmit control signals to the drive motor to selectively rotate the rotating receptacle to propel the portion for appropriate further processing. For example, if the weight indication is within predetermined tolerances, the rotating receptacle may be rotated forward to propel the portion to a downstream processing device, such as a vertical proofer or a further conveyor system. Alternatively, if the weight indication falls outside the tolerances, the weight signal processor may transmit a control signal to rotate the rotating receptacle in a reverse direction to propel the portion to a different conveyor system for corrective processing or other disposition.

In one preferred embodiment, the present invention preferably comprises a weigh station, a servo drive motor, and a selectively disengagable motor drive connection which transfers rotational motion from the drive motor to the weight station.

The Weigh Station

The weight station is preferably a freestanding device that can be positioned between the transport conveyor system and a downstream processing or conveyor system. The weigh station preferably comprises a rotating receptacle, a load cell, and an axle for mounting the rotating receptacle to the load cell.

The Rotating Receptacle

The rotating receptacle comprises one or more chambers configured to receive, support and propel a dough portion. The rotating receptacle is preferably made of a light weight, non-stick material, such as ultra high molecular weight polyethylene ("UHMW") plastic. The rotating receptacle is preferably mounted on an axle, which is supported by aluminum upright supports above the load cell. The load cell thus provides an indication of the weight of the portion in the chamber due to the displacement of a resilient counter force from the combined weight of the portion and receptacle, axle, and supports compared to the baseline load cell displacement from the empty receptacle, axle and supports. This comparison is performed quickly and automatically by the weight signal processor.

The Motor Drive Connection

The motor drive connection allows the rotating receptacle on the weigh station to be controllably driven by the servo motor, with the capability to selectively and completely disengage during the weighing process, thus eliminating extraneous inputs to the load cell from contact with the drive motor. This is preferably accomplished by the selectivity interlocking driving portion and driven portion of the motor drive connection, such as a "fork" and "T" configuration. This configuration allows the two tines of the fork portion of the connection to contact the two arms of the T portion to drive the receptacle in the desired direction. Once the rotating receptacle is driven to the desired position for weighing, the weight signal processor sends a control signal to the motor so that the fork portion is briefly driven in the reverse direction, about 5 to 10 degrees, to provide sufficient clearance between the fork and T portions of the motor drive connection to prevent contact during the weighing operation. As is apparent to one skilled in the art, many possible configurations of a selectively disengageable connection are possible, such as a gear drive with sufficient clearance between the teeth of the adjacent gears to provide free play when the drive motor is reversed a small amount on the order of 1-10 degrees, or drive connections involving selectively axially, radially or laterally displacing elements, such as solenoid, pneumatic, hydraulic or other types of drive connections and clutches. Also, as is known in the art, the operation of such selectively disengageable connections may be controlled directly by signals transmitted by the weight signal processor, or indirectly by controlling the operation of the drive motor.

Once the weighing operation is complete, the weight signal processor can send control signals to the drive motor so that the rotating receptacle is rotated as appropriate to discharge the weighed portion, and then positioned to receive the next portion to be weighed. The fork and T configuration also provides angular, lateral, and/or axial displacement tolerances in the motor drive connection to accommodate moderate misalignment between the rotating receptacle drive mechanism and the shaft of the servo motor arising due to the movable nature of the portion of the weigh station supported by the load cell.

Servo Drive Motor

The servo drive motor is preferably a servo motor with a 16-bit digital controller, suitable for receiving control signals from the weight signal processor. The drive motor may drive one weight station through a single motor drive connection, or multiple weigh stations through a gang drive mechanism, comprising a plurality of output shafts and motor drive connections driven by a single motor. Such gang drive mechanisms may, for example, comprise a series of 90° drives driven by the servo motor through an extended shaft located in proximity to each rotating receptacle.

Load Cell

As the dough portion reaches the end of the conveyor, it is received in one of chambers of the rotating receptacle. The rotating receptacle is mounted on an axle which is supported by a load cell. The load cell provides an electrical indication of the displacement of a resilient counter force due to the weight of the portion, the rotating receptacle and the upright supports. Various types of counter forces, such as springs or elastomeric materials, can be used in the load cell. The displacement of the counter force can be measured by devices which exhibit varying electrical properties under physical deformation or displacement, such as strain gages, transducers or forced motor. The analog electrical indications generated by the load cell can be converted by an analog to digital converter ("A/D") to a digital signal compatible for further processing by the weight signal processor. The load cell of the weighing apparatus preferably utilizes a dampening mechanism, such as a load cell body or counter force that is submerged in an engineered high density fluid, to provide impact cushioning and limit the post impact oscillation ("ringing") of the counter force due to the impact of the dough portion on the receptacle chamber. Upon expiration of a predetermined time interval to insure complete dampening of post-impact oscillation, or through wave form analysis methods, a static weight of the portion may be determined from the load cell indication by the weight signal processor.

Weight Signal Processor

The load cell weigh indication is input into the weight signal processor for determination of the portion weight. The weight signal processor preferably comprises an A/D converter and a data processor with digital processing capability, such as a PC.

After weighing is complete, if the weight indication is within tolerances, the weight signal processor can input a control signal to the servo motor to transmit forward rotational force through the motor drive connection to rotate the rotating receptacle in the forward direction, thus propelling the dough portion to exit the rotating receptacle towards the outbound conveyor system. Alternatively, if the weight indication is outside established tolerances, the weight signal processor can input a different control signal to the servo motor of the receptacle drive mechanism to transmit a rearward [or alternatively a greater forward] rotational force through the motor drive connection to rotate the rotating receptacle in the rearward direction, thus propelling the dough portion to exit the rotating receptacle towards a reject conveyor for corrective processing.

After the weight signal processor collects the electrical indications generated by the load cell for the portion over the selected time increments, the weight signal processor may analyze the data to determine if the static weight of the portion is within the predetermined tolerances. The weight signal processor may also store the data in electronic or other memory device, perform statistical analyses, and, if appropriate, provide corrective instructions to the dough production mechanism to achieve the desired portion weight. Depending upon whether the portion weight is within the tolerances, the dough portion may be propelled from rotating receptacle to the downstream conveyor for further processing, or to an alternative conveyor or receptacle for corrective processing. This process is repeated for successive dough portions.

Wave Form Analysis

The accuracy of the weight data can be enhanced by using wave form analysis of the load cell indications over a cycle of operation of the weigh station. A load cell pressure transducer in the weigh station produces an analog signal that is supplied to the analog to digital converter, where the analog signal is converted to a digital signal and preferably the analog signal is Sigma Delta modulated, noise shaped, quantized to a digital signal, digitally filtered and digitally decimated. The conditioned digital signal is supplied to the data processor 28, such as through the serial port in a desktop or portable laptop computer. By identifying characteristic index points in the load cell indications, for example, those spikes caused by the impact of the dough portion onto the rotating receptacle, or the initiation of the driving torque to the weigh station block connection, an indexing point in the cycle of the weigh station operation can be determined. From the indexing point, specific time intervals can be selected manually or automatically for which intervals the load cell indications are used to calculate the portion weight.

Wave Form Analysis

The data processor 28 can be programmed to perform a fast Fourier transform (FFT) or time waveform analysis of the weight time waveform produced by the load cell. Wave form analysis can be preferably be accomplished at iteration frequencies of approximately 250 hz. In this process, the analog signal from the weigh station load cell is converted to a digital signal by the analog/digital converter of the wsp, and analyzed at the rate of 250 intervals (iterations) per second.

By manual analysis of the wave form, a predetermined designation of specific time intervals following an identified index point can be established, such that for each weighing cycle the same intervals, following the index point are used for the weight indications, if the indications are within established limitations, from which the portion weight measurement is determined. For example, in a process with a target portion weight of 4.0 oz., instructions can be programmed into the weight signal processor to record the average of the first five iterations starting 0.02 seconds following a "spike" maximum weight indication which exceeds 10 oz.

Alternatively, the wave form analysis process can be automated such that during each operational cycle those intervals with indications falling within given limitations may be selected as the most reliable weight indications, from which the portion weight measurement is determined. Such predetermined parameters for selection of intervals may include, for example, a defined minimum number of consecutive intervals having weight indications within a given range, such as at least five consecutive intervals having indications within the range of 3.5-4.5 oz. and a maximum variation between indications of 0.02 oz. In this way, only stable, consistent indications are used to determine portion weight, and thus, momentary spikes in the weight indication due to the impact of the arriving dough portion in the chamber or the external forces from the servo-motor drive system can be eliminated from portion weight determination.

The present invention thus comprises an apparatus and method for weighing a plurality of portions of semi-solid matter having a load cell for producing electrical indications according to an applied load, a receptacle rotatably mounted to said load cell for receiving individual portions, a motor which operates in response to a control signal for driving the receptacle in rotary motion, a disengageable connection between the motor and the receptacle, and a processor in electrical communication with the load cell and the motor, the processor programmed to receive electrical indications from the load cell for determining a portion weight and to send a control signal to the motor to disengage the connection.

The present invention also comprises an apparatus and method comprising the steps of providing a receptacle for receiving individual portions, rotatably mounting said receptacle to a load cell for producing electrical indications according to an applied load, providing a motor which operates in response to a control signal, connecting the motor to the receptacle with a disengageable connection for driving the receptacle in rotary motion, sending a control signal to the motor to disengage the connection after a portion is received, and determining the weight of the portion from load cell indications after the connection is disengaged.

BRIEF DESCRIPTION OF THE DRAWINGS

The invention will now be further described in conjunction with the drawings, in which.

The drawings are provided for illustrative purposes only and should not be used to unduly limit the scope of the invention.

DETAILED DESCRIPTION OF A PREFERRED EMBODIMENT

Figure 1:
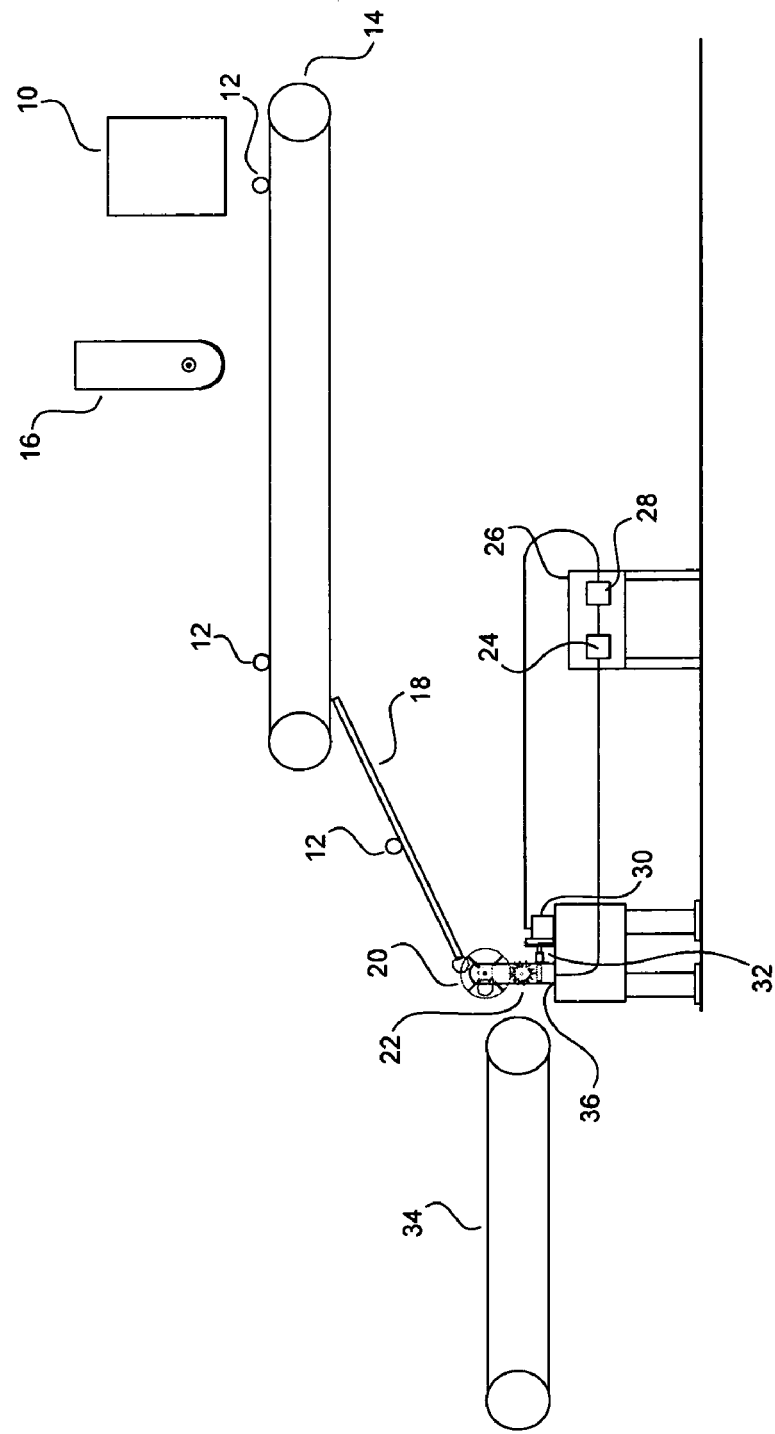
FIG. 1 is a diagram illustrating one preferred embodiment of the present invention.

FIG. 1 is an illustration of an apparatus for implementing the method of the present invention. As illustrated in FIG. 1, dough portions are produced by the dough production mechanism 10. The portions of the dough 12 are released onto a first conveyor belt 14 or other conveyor mechanism to transport the dough portions for weighing and further processing. A flour sifter 16 is preferably located above the conveyor belt 14 to disperse flour particles along the upper surface of the conveyor belt 14 in order to prevent adhesion of the dough portions 12 to the conveyor belt 14.

As the dough portion travels past the end of the first conveyor belt 14, the portion is carried by inertia and gravity down ramp 18 into the uppermost chamber of the rotating receptacle 20 on weigh station 22 for weighing. The analog weight indications generated by the load cell of the weigh station 22 are converted by A/D converter 24 of the weight signal processor 26 and input into the data processor 28. Following the weighing operation, the dough portion 12 is propelled to a downstream conveyor 34 for further processing, by rotation of the receptacle 20. The rotation of the receptacle 20 is controlled by a signal initiated by the processor 28 of the weight signal processor 26 and sent to the driver motor 30. The drive motor 30 engages the rotating receptacle 20 of the weigh station 22 through the motor drive connection 32.

Weigh Station

The weight of the portion can be derived by a load cell supporting a rotating receptacle having preferably four chambers, which is driven by a servo motor controlled by a 16 bit encoder. The servo motor can also be used to drive a gang-drive system which may simultaneously operate multiple, preferably 4 to 10 rotating receptacles using a gang-drive mechanism, which comprises an extended drive shaft having multiple right angle drives. Each right angle drive provides rotational force to one of the multiple weight stations, each fitted with a rotating receptacle.

The rotating receptacle dissipates the forward momentum of the dough portion 10, thus causing it to rest in the rotating receptacle. The rotating receptacle 20 is preferably supported by a fluid restricted strain gauge load cell 36, which dampens the motion of the rotating receptacle 20 due to the downward force of the impact of the dough portion 12. This impact dampening results from the fluid restriction of dense silicon fluid, thus dampening the mechanical response of the receptacle to enable an accurate weight indication to be obtained from the strain gauge element of the load cell 36. As is apparent to one skilled in the art, other types of impact dampening can alternatively be used to eliminate post-impact oscillation, such as other viscous fluids, resilient materials, magnetic fields, friction or pneumatic dampening.

Figure 2:
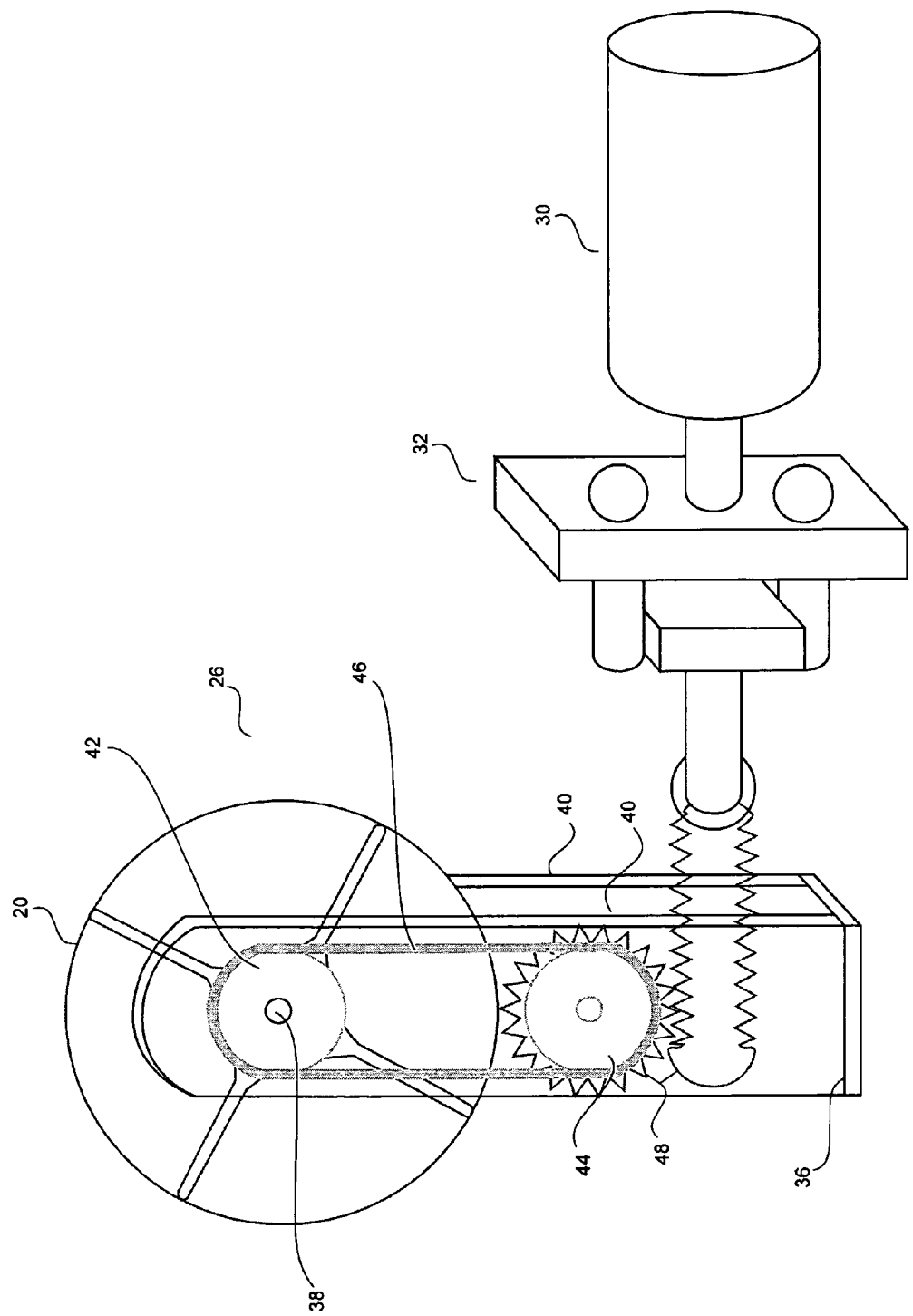
FIG. 2 is a diagram illustrating the weight station of one preferred embodiment of the present invention.

As illustrated in FIG. 2, the weigh station preferably comprises a rotating receptacle 22, an axle 38 for rotatably mounting the rotating receptacle, two vertical supports 40 for supporting the shaft, a sprocket 42 secured to the rotating receptacle 20 for driving the rotating receptacle, a driving sprocket 44 connected to the rotating receptacle sprocket 42 by a Teflon-coated stainless steel ladder chain 46, a 90° worm gear drive 48 for transferring torque received through the motor drive connection 32 to the driving sprocket 44 and through the chain 46 to the rotating receptacle sprocket 42. As is apparent to one skilled in the art, many possible configurations of a drive connection are possible, including belts, pulleys, gears, and shafts, as well as incorporating portions of the motor drive connection 32 directly into the configuration of the rotating receptacle 20. These components are supported by the load cell 36, which preferably includes a strain gauge and counter-force for producing electrical indications corresponding to the weight supported by the load cell 36.

As depicted in FIG. 2, by transmitting appropriate control signals to the drive motor, the rotating receptacle 20 can be positioned in an orientation such that the uppermost wall between successive chambers is approximately 15 degrees from vertical, so that the dough portion can be restrained as it enters the chamber. During the time period while the impact of the dough portion is dissipated by the counterforce of the load cell, the indication from the load cell strain gauge may be inaccurate for the purpose of determining the weight of the arriving portion. However, once the inertia of the driving portion has been dissipated, and the driving pegs have been reversed sufficiently to allow unimpeded support of the rotating receptacle by the load cell, an accurate reading of the portion weight may be obtained.

Motor Drive

Figure 3:
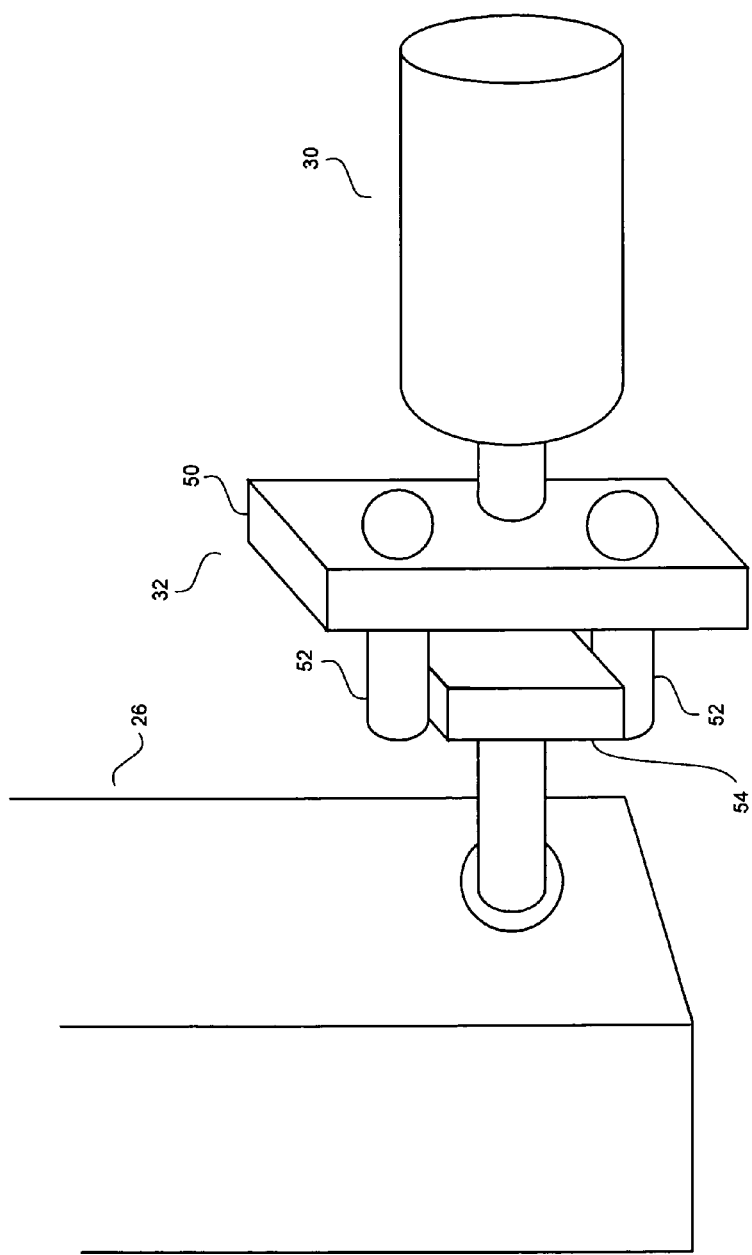
FIG. 3 is a diagram illustrating the motor drive connection of one preferred embodiment of the present invention.

As shown in FIG. 3, the rotating receptacle weighing apparatus is able to make accurate weight indications of the portion suspended in the rotating receptacle by isolating the rotating receptacle 20 from the drive motor 30 which controls its rotational movement. This is accomplished by the incorporation of a motor drive connection 32 which can be selectively disengaged from the rotating receptacle 20. This drive connection preferably comprises two mating components; a fork 50 with two or more pegs 52 on the driving side, and one or more blocks 54 on the driven side to transfer rational force for controllably driving the rotating receptacle 20. By reversing the drive motor 30 a small amount, sufficient clearance is provided between the driving and the driven components such that the block 54 connected to the weigh station 22 is completely isolated from the pegs 52 connected to the drive motor. Accordingly, no force or resistance to movement will be applied to the weigh station 22, thus allowing an accurate weight measurement to be taken by the load cell 36 which supports the rotating receptacle 20.

Weight Signal Processor

Figure 4:
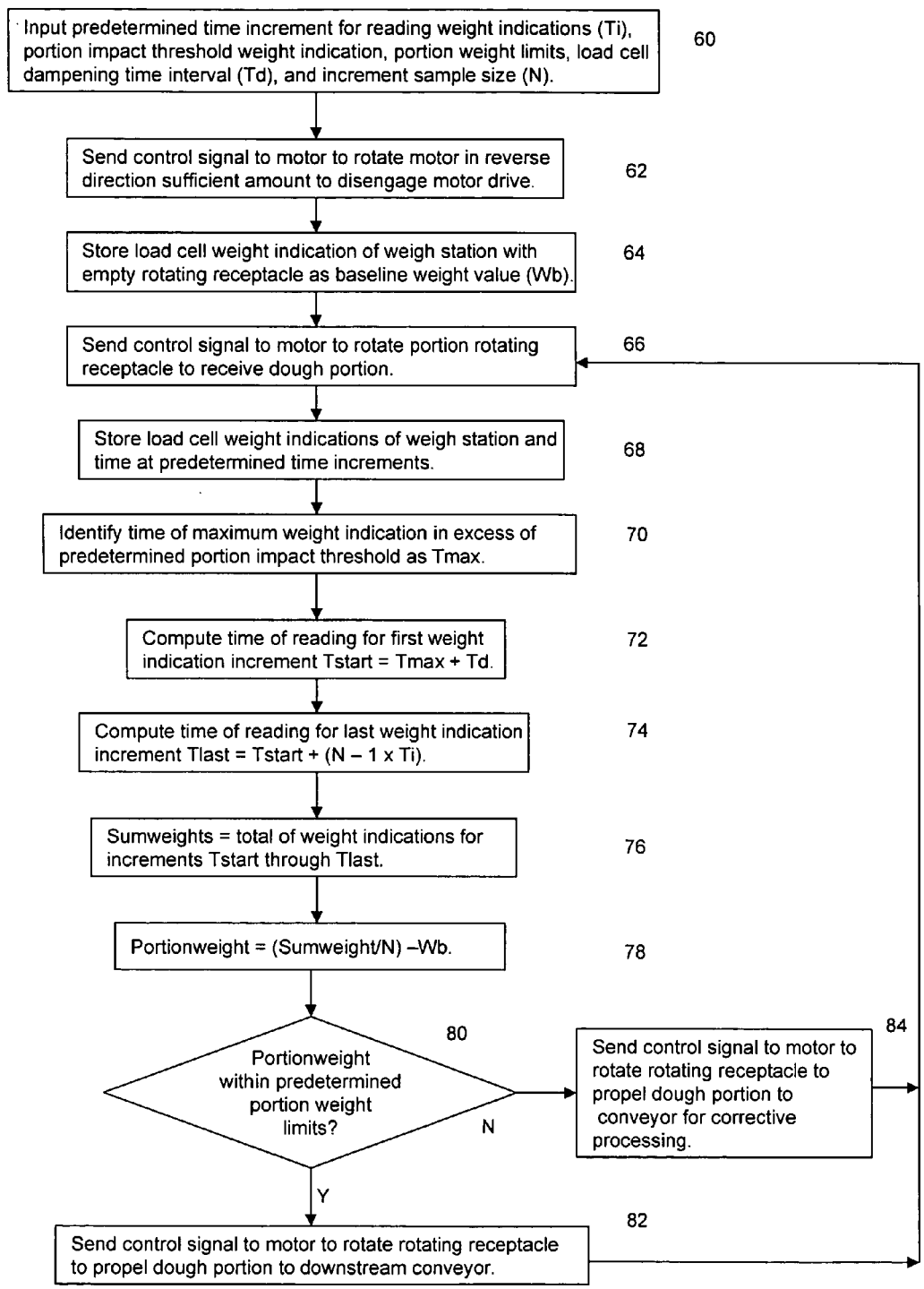
FIG. 4 is a flow chart diagram illustrating the operation of the weight signal processor of one preferred embodiment of the present invention.

As is known in the art, many types of data processing devices can be used for the data processor 28 of the weight signal processor 26, including personal computers ("PCs"). The operation of the weight signal processor 26 is further detailed in FIG. 4. As illustrated in FIG. 4, the process starts with the input of the values for the predetermined time increment for reading weight indications (Ti), the portion impact threshold weight indication, the upper and lower portion weight limits, the load cell dampening time interval (Td), and the increment sample size (N) in step 60. Next, a control signal is sent to the drive motor 30 (step 62), which rotates the motor in the reverse direction sufficient to disengage the pegs 52 of the fork 50, which is connected to the drive motor 30, from the block 54, which is connected to the weigh station 22, so that the empty weight of the weigh station 22 can be determined in step 64. In step 64 the load cell weight indication of weigh station with the empty rotating receptacle 20 is stored as the baseline weight value (Wb).

The process of weighing the dough portions begins with step 66 by the data processor 28 sending a control signal to the motor 30 to rotate to orient the rotating receptacle to 20 receive the first dough portion 12 from the upstream conveyor 14. Next, in step 68, the data processor 28 stores weight indications from the load cell of the weigh station at predetermined time increments in step along an identification of the time interval during which the indication was taken. From this stored data, the data processor 28 identifies the maximum weight indication in excess of the predetermined portion impact threshold, and stores the reference data corresponding to the time interval of the maximum indication as Tmax in step 70.

Thus, once the impact of the dough portion upon the scale receptacle is detected by the weight signal processor 26 from a weight indication of sufficient magnitude (spike) transmitter from the strain gauge element in the load cell 36, a predetermined dampening time interval, Td, is measured by the data processor 32 to insure complete dampening to eliminate post-impact oscillation. This is accomplished in step 72 by computing the starting interval time of the first weight indication increment, Tstart, as the sum of the time Tmax plus the dampening time interval, Td. The predetermined dampening time interval is preferably no greater than 0.7 second. A predetermined dampening time interval of approximately 0.16 second may be of sufficient duration to eliminate post-impact oscillation.

Upon expiration of the dampening time interval, an accurate weight indication of the receptacle and portion can be taken by averaging the indications from the next N intervals and comparing the average to an indication of the empty receptacle to determine the portion weight. This interval determination is accomplished in step 74 by computing the time of reading for last weight indication increment in the sequence, Tlast, as Tstart plus (N minus 1) multiplied by the time interval duration, Ti. Next, in step 76, the data processor 28 totals the weight indications for the N increments, Tstart through Tlast, and stores the value as "Sumweights." In step 78, the data processor 28 calculates the weight of the portion 12 as the value "Portionweight" by dividing Sumweights by the number of increments ,N, to determine the average increment indication and subtracting the baseline empty weigh station indication, Wb.

In step 80, the data processor 28 tests the Portionweight value to ascertain whether it falls within the predetermined portion limits. If so, in step 82, the data processor 28 sends a control signal to motor to rotate rotating receptacle to propel the dough portion to downstream conveyor. The rotation of the rotating receptacle 20 also releases accumulated flour and other matter from the receptacle chambers to enhance the accuracy of weight indication. Then the process repeats at step 66 to receive the next dough portion for weighing.

Alternatively, if the indicated weight of the portion falls outside the control range, it is considered to be non-conforming and in step 84, the data processor 28 sends a control signal to motor to rotate rotating receptacle to propel the dough portion to an appropriate conveyor for corrective processing. After step 84, the weight signal processor continues on to step 66 and subsequent to receive and evaluate the indicated weight of the next succeeding portion in the process.

As is apparent to one skilled in the art, various alternatives for disposition of portions with weights outside the control range, including further processing as with portions within the control range, providing a signal to an operator or device for recognition and/or removal of the out of range portion.

Optionally, by using an encoder to determine the operating speed of the downstream conveyor or other receiving device, such as an overhead proofer, the loading and discharging of the rotating receptacle may be synchronized to deliver a dough portion to the next vacant receptacle on the overhead proofer when it is in the appropriate position in proximity to the rotating receptacle.

Wave Form Analysis

As previously discussed, time waveform analysis of the weight time waveform produced by the load cell can be accomplished to identify specific optimum time intervals to be used for the weight indications from which the portion weight measurement is determined.

Although the subject invention has been described in use primarily with respect to bread dough, the invention is applicable to many other production processes involving controlled weight portions of semi-solid matter, including but not limited to agricultural and food products, polymers, plastics, resins, cellulose, gelatins, refractory products, ceramics and the like. Many changes, modifications, variations, combinations, subcombinations and other uses and applications of the subject invention will be and become apparent to those skilled in the art after considering this specification and the accompanying drawings, which disclose a preferred embodiment thereof. All such changes, modifications, variations, and other uses and applications that do not depart from the spirit and scope of the invention are deemed to be covered by the invention, which is to be limited only by the claims which follow.

What is claimed is:

1. A method of weighing a plurality of portions of semi-solid matter comprising the steps of:
   providing a receptacle for receiving individual portions;
   rotatably mounting said receptacle to a load cell for producing electrical indications according to an applied load;
   providing a motor which operates in response to a control signal;
   connecting the motor to the receptacle with a disengageable connection which drives the receptacle in rotary motion when engaged, and provides a complete physical separation between the load cell and the motor when disengaged;
   sending a control signal to the motor to disengage the connection after a portion is received; and
   determining the weight of the portion from load cell indications after the connection is disengaged.

2. The method of claim 1 further comprising the step of sending a control signal to the motor to rotate the receptacle to discharge the portion after determining the portion weight.

3. The method of claim 2 further comprising the step of sending a control signal to the motor to rotate to position the receptacle to receive a next portion.

4. The method of claim 1 further comprising the step of receiving electrical indications from the load cell to determine when the portion is received in the receptacle.

5. The method of claim 1 further comprising the step of sending a control signal to the motor to disengage the connection after the portion is received.

6. The method of clam 1 further comprising the step of determining from the load cell electrical indications when the portion is received in the receptacle, and sending a control signal to the motor to disengage the connection after the portion is received.

7. The method of claim 1 further comprising the step of determining whether the portion weight falls within predetermined limits, and sending a control signal to the motor to rotate the receptacle to propel the portion based upon said determination.

8. The method of claim 1 further comprising the steps of:
   inputting values for a delay time and a portion impact weight indication;

receiving a weight indication in excess of the portion impact weight indication value which triggers the measuring of the delay time; and determining the portion weight from at least one weight indication received at the expiration of the delay time.

9. The method of claim 1 further comprising the steps of:

storing a value of the load cell weight indication in an empty condition; and determining the portion weight by subtracting the empty load cell indication from at least one weight indication received at the expiration of the delay time.

10. The method of claim 1 further comprising the steps of:

inputting values for an interval duration, an interval count value N, a consistency variance, and a portion impact weight indication;

receiving a weight indication in excess of the portion impact weight indication value; and determining the portion weight from an average of at least N successive weight indications having a difference from one another no more than the consistency variance, which successive indications are received at intervals equal to the interval duration, and which successive indications are received following the weight indication in excess of the portion impact weight.

11. The method of claim 1 further comprising the steps of:

storing a value of the load cell weight indication in an empty condition; and determining the portion weight by subtracting the empty load cell indication from at least one weight indication received at the expiration of the delay time.

12. A method of weighing a plurality of portions of semi-solid matter comprising the steps of:

providing a receptacle for receiving individual portions;

rotatably mounting said receptacle to a load cell for producing electrical indications according to an applied load;

providing a motor which operates in response to a control signal;

connecting the motor to the receptacle with a disengageable connection which drives the receptacle when engaged, and provides a complete physical separation between the load cell and the motor when disengaged and which operates in response to a control signal;

sending a control signal to the connection to disengage after a portion is received; and determining the weight of the portion from load cell indications after the connection is disengaged.

13. An apparatus for weighing a plurality of portions of semi-solid matter comprising:

a load cell for producing electrical indications according to an applied load;

a receptacle rotatably mounted to said load cell for receiving individual portions;

a motor which operates in response to a control signal for driving the receptacle in rotary motion;

a disengageable connection between the motor and the receptacle which drives the receptacle when engaged, and provides a complete physical separation between the load cell and the motor when disengaged; and a processor in electrical communication with the load cell and the motor, the processor programmed to receive electrical indications from the load cell for determining a portion weight and to send a control signal to the motor to disengage the connection.

14. The apparatus of clam 13 wherein the processor is programmed to send a control signal to the motor to rotate the receptacle to discharge the portion.

15. The apparatus of clam 13 wherein the processor is programmed to send a control signal to the motor to position the receptacle to receive a next portion.

16. The apparatus of clam 13 wherein the processor is programmed to receive electrical indications from the load cell for determining a portion weight after the connection is disengaged.

17. The apparatus of clam 13 wherein the processor is programmed to receive electrical indications from the load cell for determining when a portion is received in the receptacle, and to send a control signal to the motor to disengage the connection after the portion is received.

18. The apparatus of clam 13 wherein the processor is programmed to determine from the load cell electrical indications when a portion is received in the receptacle, and to send a control signal to the motor to disengage the connection after the portion is received.

19. The apparatus of clam 13 wherein the processor is programmed to determine whether the portion weight falls within predetermined limits, and to send a control signal to the motor to rotate the receptacle to propel the portion based upon said determination.

20. The apparatus of clam 13 further comprising an analog/digital converter.

21. The apparatus of clam 13 wherein the load cell further comprises a dampening device.

* * * * *